United States Patent
Hämäläinen et al.

(10) Patent No.: US 12,309,694 B2
(45) Date of Patent: May 20, 2025

(54) MAPPING BETWEEN CELL LOAD AND RECTIFIER EFFICIENCY

(71) Applicant: Nokia Solutions and Networks Oy, Espoo (FI)

(72) Inventors: Seppo Olavi Hämäläinen, Espoo (FI); Claudine Batsleer, Antwerp (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/920,949

(22) Filed: Oct. 20, 2024

(65) Prior Publication Data

US 2025/0133492 A1    Apr. 24, 2025

(30) Foreign Application Priority Data

Oct. 20, 2023    (FI) ..................................... 20236167

(51) Int. Cl.

| | |
|---|---|
| *H04W 88/08* | (2009.01) |
| *H02J 3/00* | (2006.01) |
| *H02J 3/32* | (2006.01) |
| *H02J 7/02* | (2016.01) |
| *H04W 24/02* | (2009.01) |
| *H04W 28/086* | (2023.01) |
| *H04W 52/02* | (2009.01) |

(52) U.S. Cl.
CPC ....... *H04W 52/0206* (2013.01); *H02J 3/0075* (2020.01); *H02J 3/32* (2013.01); *H02J 7/02* (2013.01); *H04W 24/02* (2013.01); *H04W 28/0861* (2023.05); *H04W 88/08* (2013.01)

(58) Field of Classification Search
CPC ......... H04W 52/0306; H04W 28/0861; H04W 24/02; H04W 88/08; H02J 3/32; H02J 3/0075; H02J 7/02
USPC ......................................................... 370/235
See application file for complete search history.

(56) References Cited

U.S. PATENT DOCUMENTS

| | | | |
|---|---|---|---|
| 2013/0136072 A1* | 5/2013 | Bachmann | H04W 68/00 370/329 |
| 2014/0220957 A1 | 8/2014 | Fischer | |
| 2015/0163735 A1 | 6/2015 | Fischer | |
| 2019/0182766 A1 | 6/2019 | Eleftheriadis et al. | |

(Continued)

FOREIGN PATENT DOCUMENTS

| | | |
|---|---|---|
| CN | 114828042 A | 7/2022 |
| EP | 2439988 A1 | 4/2012 |

OTHER PUBLICATIONS

"IEEE 802.11", Wikipedia, Retrieved on Oct. 17, 2024, Webpage available at : https://en.wikipedia.org/wiki/IEEE_802.11.

(Continued)

*Primary Examiner* — Gbemileke J Onamuti
(74) *Attorney, Agent, or Firm* — Nokia Technologies Oy

(57) ABSTRACT

Disclosed is a method comprising receiving, from a power supply unit of a base station, measurement information for one or more parameters related to an efficiency of a rectifier of the power supply unit; receiving cell load measurements indicative of a cell load of the base station; determining, based on the measurement information and the cell load measurements, a mapping between the cell load and the efficiency of the rectifier; and adjusting, based on the mapping, at least one of: the cell load of the base station, or one or more configuration parameters of the power supply unit.

16 Claims, 7 Drawing Sheets

(56) References Cited

U.S. PATENT DOCUMENTS

2022/0181903 A1   6/2022   Luo et al.
2023/0276253 A1   8/2023   Niemela et al.

OTHER PUBLICATIONS

"IEEE 802.15", Wikipedia, Retrieved on Oct. 17, 2024, Webpage available at : https://en.wikipedia.org/wiki/IEEE_802.15.
Office Action received for corresponding Finnish Patent Application No. 20236167, dated Mar. 19, 2024, 13 pages.
Office Action received for corresponding Finnish Patent Application No. 20236167, dated Jun. 18, 2024, 8 pages.
Extended European Search Report received for corresponding European Patent Application No. 24206825.2, dated Mar. 18, 2025, 8 pages.
Chatzipapas et al., "On the Minimization of Power Consumption in Base Stations using on/off Power Amplifiers", IEEE Online Conference on Green Communications, Sep. 26-29, 2011, pp. 18-23.

\* cited by examiner

MAPPING BETWEEN CELL LOAD AND RECTIFIER EFFICIENCY

RELATED APPLICATION

This application claims benefit of priority from Finnish Patent App. No 20236167, filed Oct. 20, 2023, the disclosure of which is hereby incorporated in its entirety by reference herein.

FIELD

The following example embodiments relate to wireless communication and to rectifiers.

BACKGROUND

A rectifier in a base station is an electronic component designed to convert alternating current (AC) into direct current (DC). The rectifier ensures that the electronic circuits in the base station receive stable and continuous DC power for their operation. The efficiency of the rectifier may be defined as output DC power as a function of input AC power. High efficiency is generally desirable to minimize heat generation and reduce energy consumption.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions that, when executed by the at least one processor, cause the apparatus at least to: receive, from a power supply unit of a base station, measurement information for one or more parameters related to an efficiency of a rectifier of the power supply unit; receive cell load measurements indicative of a cell load of the base station; determine, based on the measurement information and the cell load measurements, a mapping between the cell load and the efficiency of the rectifier; and adjust, based on the mapping, at least one of: the cell load of the base station, or one or more configuration parameters of the power supply unit.

According to another aspect, there is provided an apparatus comprising: means for receiving, from a power supply unit of a base station, measurement information for one or more parameters related to an efficiency of a rectifier of the power supply unit; means for receiving cell load measurements indicative of a cell load of the base station; means for determining, based on the measurement information and the cell load measurements, a mapping between the cell load and the efficiency of the rectifier; and means for adjusting, based on the mapping, at least one of: the cell load of the base station, or one or more configuration parameters of the power supply unit.

According to another aspect, there is provided a method comprising: receiving, from a power supply unit of a base station, measurement information for one or more parameters related to an efficiency of a rectifier of the power supply unit; receiving cell load measurements indicative of a cell load of the base station; determining, based on the measurement information and the cell load measurements, a mapping between the cell load and the efficiency of the rectifier; and adjusting, based on the mapping, at least one of: the cell load of the base station, or one or more configuration parameters of the power supply unit.

According to another aspect, there is provided a computer program comprising instructions which, when executed by an apparatus, cause the apparatus to perform at least the following: receiving, from a power supply unit of a base station, measurement information for one or more parameters related to an efficiency of a rectifier of the power supply unit; receiving cell load measurements indicative of a cell load of the base station; determining, based on the measurement information and the cell load measurements, a mapping between the cell load and the efficiency of the rectifier; and adjusting, based on the mapping, at least one of: the cell load of the base station, or one or more configuration parameters of the power supply unit.

According to another aspect, there is provided a computer readable medium comprising program instructions which, when executed by an apparatus, cause the apparatus to perform at least the following: receiving, from a power supply unit of a base station, measurement information for one or more parameters related to an efficiency of a rectifier of the power supply unit; receiving cell load measurements indicative of a cell load of the base station; determining, based on the measurement information and the cell load measurements, a mapping between the cell load and the efficiency of the rectifier; and adjusting, based on the mapping, at least one of: the cell load of the base station, or one or more configuration parameters of the power supply unit.

According to another aspect, there is provided a non-transitory computer readable medium comprising program instructions which, when executed by an apparatus, cause the apparatus to perform at least the following: receiving, from a power supply unit of a base station, measurement information for one or more parameters related to an efficiency of a rectifier of the power supply unit; receiving cell load measurements indicative of a cell load of the base station; determining, based on the measurement information and the cell load measurements, a mapping between the cell load and the efficiency of the rectifier; and adjusting, based on the mapping, at least one of: the cell load of the base station, or one or more configuration parameters of the power supply unit.

LIST OF DRAWINGS

In the following, various example embodiments will be described in greater detail with reference to the accompanying drawings, in which FIG. 1 illustrates an example of a wireless communication network;

DETAILED DESCRIPTION

The following embodiments exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Some example embodiments described herein may be implemented in a wireless communication network comprising a radio access network based on one or more of the following radio access technologies (RATs): Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications. IEEE is an abbreviation for the Institute of Electrical and Electronics Engineers.

Figure 1:
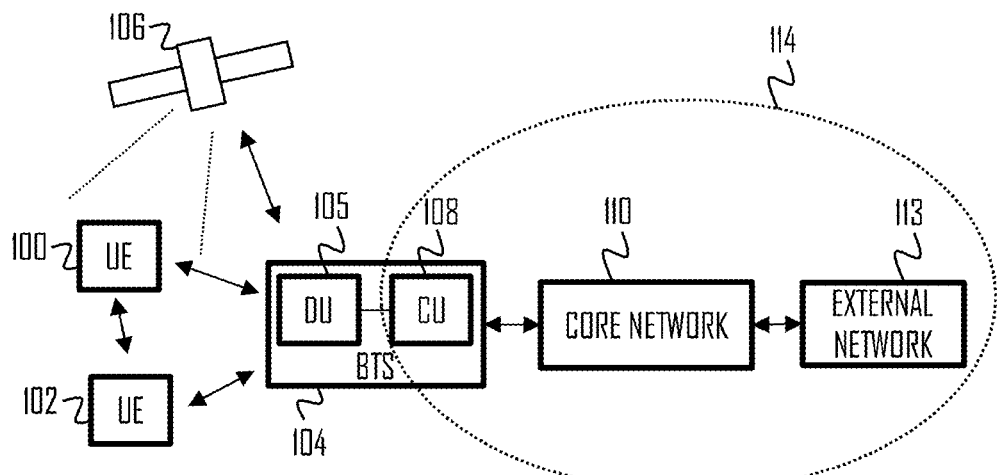

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the example embodiments described herein to other wireless communication networks provided with necessary properties.

The example wireless communication network shown in FIG. 1 includes a radio access network (RAN) and a core network 110.

FIG. 1 shows user equipment (UE) 100, 102 configured to be in a wireless connection on one or more communication channels in a radio cell with a base station 104 of a radio access network.

The base station 104 may comprise a computing device configured to control the radio resources of the base station 104 and to be in a wireless connection with one or more UEs 100, 102. The base station 104 may also be referred to as a base transceiver station (BTS), an access point, an access node a cell site, a network node, a radio access network node, or a RAN node. The base station 104 may be, for example, an evolved NodeB (abbreviated as eNB or eNodeB), or a next generation evolved NodeB (abbreviated as ng-eNB), or a next generation NodeB (abbreviated as gNB or gNodeB), providing the radio cell. The base station 104 may include or be coupled to transceivers. From the transceivers of the base station 104, a connection may be provided to an antenna unit that establishes a bi-directional radio link to one or more UEs 100, 102. The antenna unit may comprise an antenna or antenna element, or a plurality of antennas or antenna elements.

The wireless connection (e.g., radio link) from a UE 100, 102 to the base station 104 may be called uplink (UL) or reverse link, and the wireless connection (e.g., radio link) from the base station 104 to the UE 100, 102 may be called downlink (DL) or forward link. A UE 100 may also communicate directly with another UE 102, and vice versa, via a wireless connection generally referred to as a sidelink (SL). It should be appreciated that the base station 104 or its functionalities may be implemented by using any node, host, server, access point or other entity suitable for providing such functionalities.

The radio access network may comprise more than one base station 104, in which case the base stations may also be configured to communicate with one another over wired or wireless links. These links between base stations may be used for sending and receiving control plane signaling and also for routing data from one base station to another base station.

The base station 104 may further be connected to a core network (CN) 110. The core network 110 may comprise an evolved packet core (EPC) network and/or a 5th generation core network (5GC). The EPC may comprise network entities, such as a serving gateway (S-GW for routing and forwarding data packets), a packet data network gateway (P-GW) for providing connectivity of UEs to external packet data networks, and/or a mobility management entity (MME). The 5GC may comprise one or more network functions, such as at least one of: a user plane function (UPF), an access and mobility management function (AMF), a location management function (LMF), and/or a session management function (SMF).

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

It should also be understood that the distribution of functions between core network operations and base station operations may differ in future wireless communication networks compared to that of the LTE or 5G, or even be non-existent.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device, just to mention but a few names. The UE 100, 102 may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or a computing device comprising a wireless modem integrated in a vehicle.

It should be appreciated that the UE 100, 102 may also be a nearly exclusive uplink-only device, of which an example may be a camera or video camera loading images or video clips to a network. The UE 100, 102 may also be a device having capability to operate in an Internet of Things (IoT) network, which is a scenario in which objects may be provided with the ability to transfer data over a network without requiring human-to-human or human-to-computer interaction.

The wireless communication network may also be able to support the usage of cloud services. For example, at least part of core network operations may be carried out as a cloud service (this is depicted in FIG. 1 by "cloud" 114). The UE 100, 102 may also utilize the cloud 114. In some applications, the computation for a given UE may be carried out in the cloud 114 or in another UE.

The wireless communication network may also comprise a central control entity, such as a network management system (NMS), or the like.

5G enables using multiple-input and multiple-output (MIMO) antennas in the base station 104 and/or the UE 100, 102, many more base stations than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine-type applications, such as (massive) machine-type communications (mMTC), including vehicular safety, different sensors and real-time control.

In 5G wireless communication networks, base stations and/or UEs may have multiple radio interfaces, such as below 6 gigahertz (GHz), centimeter wave (cmWave) and millimeter wave (mmWave), and also being integrable with legacy radio access technologies, such as LTE. Integration with LTE may be implemented, for example, as a system, where macro coverage may be provided by LTE, and 5G radio interface access may come from small cells by aggregation to LTE. In other words, a 5G wireless communication network may support both inter-RAT operability (such as interoperability between LTE and 5G) and inter-RI operability (inter-radio interface operability, such as between below 6 GHz, cmWave, and mmWave).

5G wireless communication networks may also apply network slicing, in which multiple independent and dedicated virtual sub-networks (network instances) may be created within the same physical infrastructure to run services that have different requirements on latency, reliability, throughput and mobility.

In one embodiment, a base station 104 may comprise: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the base station 104 may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP) and/or packet data convergence protocol (PDCP), of the NR protocol stack for a base station 104. The CU 108 may comprise a control plane (CU-CP), which may be a logical node hosting the RRC and the control plane part of the PDCP protocol of the NR protocol stack for the base station 104. The CU 108 may further comprise a user plane (CU-UP), which may be a logical node hosting the user plane part of the PDCP protocol and the SDAP protocol of the CU for the base station 104.

The DU 105 may be a logical node hosting radio link control (RLC), medium access control (MAC) and/or physical (PHY) layers of the NR protocol stack for the base station 104. The operations of the DU 105 may be at least partly controlled by the CU 108. It should also be understood that the distribution of functions between the DU 105 and the CU 108 may vary depending on the implementation.

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the radio access network by utilizing network function virtualization (NFV) and software defined networking (SDN). Using edge cloud may mean base station operations to be carried out, at least partly, in a computing system operationally coupled to a remote radio head (RRH) or a radio unit (RU) of a base station 104. It is also possible that base station operations may be performed on a distributed computing system or a cloud computing system located at the base station 104. Application of cloud RAN architecture enables RAN real-time functions being carried out at the radio access network (e.g., in a DU 105), and non-real-time functions being carried out in a centralized manner (e.g., in a CU 108).

5G (or new radio, NR) wireless communication networks may support multiple hierarchies, where multi-access edge computing (MEC) servers may be placed between the core network 110 and the base station 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network 110, enabling more extensive network coverage. Possible use cases may include: providing service continuity for machine-to-machine (M2M) or Internet of Things (IoT) devices or for passengers on board of vehicles, or ensuring service availability for critical communications, and future railway, maritime, or aeronautical communications. Satellite communication may utilize geostationary earth orbit (GEO) satellite systems, but also low earth orbit (LEO) satellite systems, in particular mega-constellations (i.e., systems in which hundreds of (nano) satellites are deployed). A given satellite 106 in the mega-constellation may cover several satellite-enabled network entities that create on-ground cells. The on-ground cells may be created through an on-ground relay access node or by an access node located on-ground or in a satellite.

It is obvious for a person skilled in the art that the base station 104 depicted in FIG. 1 is just an example of a part of a radio access network, and in practice the radio access network may comprise a plurality of base stations 104, the UEs 100, 102 may have access to a plurality of radio cells, and the radio access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of a radio access network, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The base station(s) 104 of FIG. 1 may provide any kind of these cells. A cellular radio network may be implemented as a multilayer access networks including several kinds of radio cells. In multilayer access networks, one base station may provide one kind of a radio cell or radio cells, and thus a plurality of base stations may be needed to provide such a multilayer access network.

For fulfilling the need for improving performance of radio access networks, the concept of "plug-and-play" base stations may be introduced. A radio access network, which may be able to use "plug-and-play" base stations, may include, in addition to Home eNodeBs or Home gNodeBs, a Home Node B gateway (HNB-GW) (not shown in FIG. 1). An HNB-GW, which may be installed within an operator's radio access network, may aggregate traffic from a large number of Home eNodeBs or Home gNodeBs back to a core network 110 of the operator.

Figure 2:
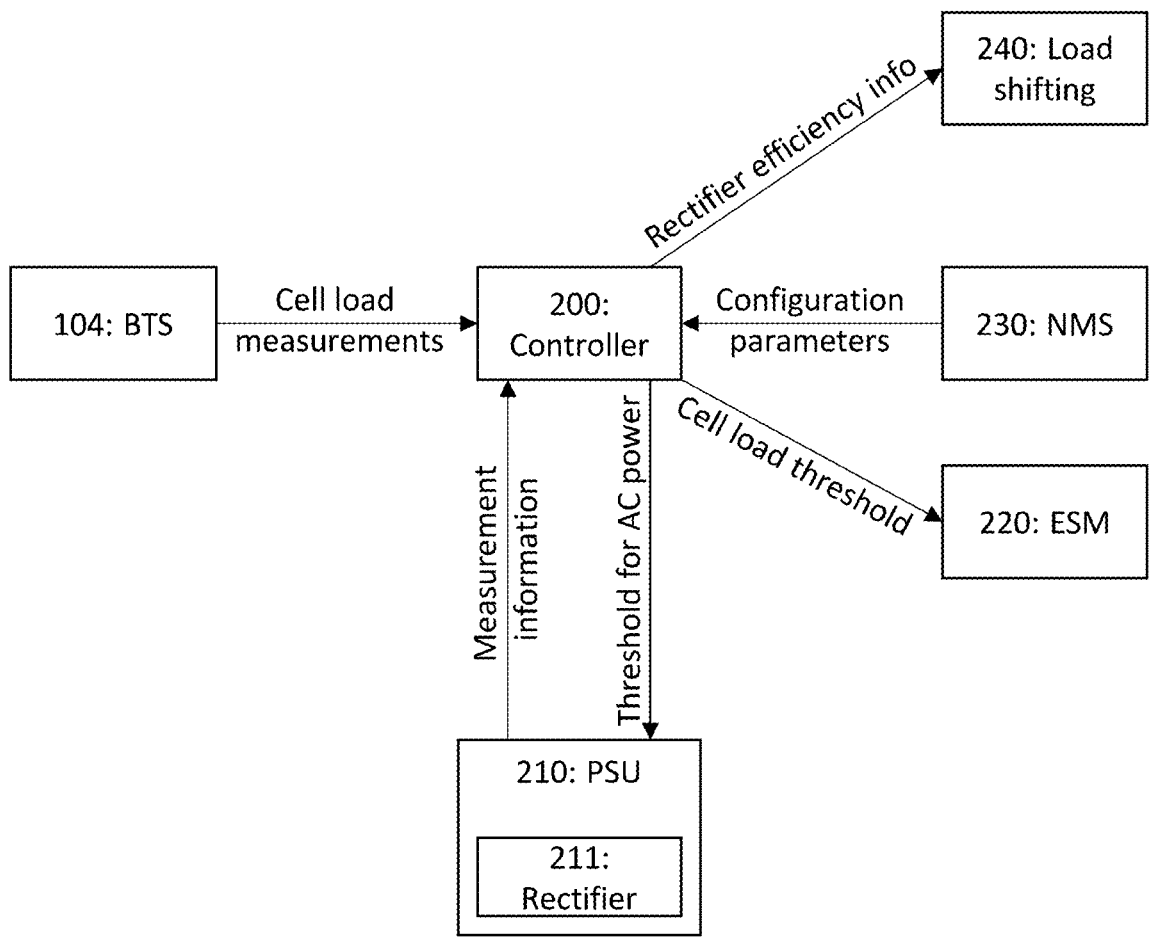
FIG. 2 illustrates an example of a system.

FIG. 2 illustrates an example of a system, to which some example embodiments may be applied. The system may comprise at least a base station 104, a power supply unit (PSU) 210 of the base station 104, a rectifier 211 comprised in the PSU 210, a controller 200, an energy saving management (ESM) function 220, a load shifting function 240, and a configuration database or network management system (NMS) 230.

The base station 104 may use the power grid as its main power source, but the base station 104 may also comprise one or more batteries as a back-up power source that may be used during power outages, for example.

In a virtual power plant (VPP) scenario, the back-up batteries of one or more base stations 104 may be organized as a virtual power plant that can be operated as a separate entity or integrated to a VPP. Such a scheme may also be referred to as a radio network virtual power plant. A VPP is a distributed power plant that aggregates the capacities of distributed energy resources (DERs), such as back-up batteries of base stations 104, to provide reliable and flexible electricity supply and management. VPP may involve active participation in energy balancing markets, such as fast frequency reserve (FFR) and frequency containment reserve (FCR) markets, that a transmission system operator (TSO) has established in order to support the stability of a power grid (electricity grid). The idea of VPP is to create a marketplace, where for a short duration (e.g., until the actual reserve power plants start producing power), some external energy resources, such as base station batteries, are used so that the power grid frequency is restored to its nominal value instantly or at least almost instantly. For this behavior, the TSO may compensate the external parties who own these external energy resources.

The load shifting function 240 refers to the capability of redistributing power consumption of the base station 104 over time to optimize energy utilization and potentially reduce costs. This may be accomplished through smart energy management algorithms that shift non-essential or deferrable workloads to off-peak hours, when electricity rates may be lower or when renewable energy is more abundant. Whereas VPP is about a bidding market, where a TSO is providing compensation for a short duration of off-loading base stations from the power grid to balance the energy supply and demand in the power grid, load shifting is about making use of electricity price fluctuation. The idea of load shifting is to charge the batteries when the electricity price is low (e.g., below a threshold), and off-load from the power grid by using the battery power when the price is high (e.g., above a threshold). In case of VPP, the CSP needs an aggregation platform and to participate in the auction market set up by the TSO. However, load shifting is a simpler approach, where there is no need for aggregation or TSO involvement. For load shifting, the CSPs themselves can decide and act, when the advantages in the energy market in terms of electricity price fluctuation are apparent.

The load shifting function 240 may be comprised in the NMS 230, or a self-organizing network (SON) function, or a VPP controller.

The VPP controller refers to a decision-making entity that makes decisions for VPP actions and/or load shifting actions. The VPP controller may reside, for example, in the near-RT RIC or NMS 230, or in a system module or in a dedicated server or cloud. The VPP controller is a software program that manages and coordinates the operation of multiple distributed energy resources (e.g., the one or more batteries of the base station 104) within a virtual power plant. The VPP controller facilitates the aggregation, monitoring, control, and optimization of these distributed energy resources to collectively act as a single, flexible, and responsive power generation and consumption entity.

The ESM 220 is a function or algorithm that controls the resources of the base station 104 in order to save energy. For example, the ESM 220 may switch off radio layers (e.g., macro or small cell, 2G, 3G, 4G, or 5G) or dynamically mute transmitter and/or receiver paths to save energy in low cell load conditions. This has an impact on the power consumption of the base station 104.

The ESM 220 may be comprised in the NMS 230, or a SON function, or the VPP controller.

The NMS 230 is a centralized suite of software and hardware used to monitor, control, and administer the network infrastructure. The NMS 230 is responsible for a wide range of tasks such as fault management, configuration management, security management, performance management, and accounting management. The NMS 230 enables network operators to efficiently manage and optimize network resources, ensuring that the network delivers high performance, reliability, and security.

The PSU 210 is configured to supply electrical energy from the power grid (electricity grid) via the rectifier 211 to operate the base station 104 and/or to charge the one or more (back-up) batteries of the base station 104. The PSU 210 also comprises the one or more (back-up) batteries of the base station 104. The PSU 210 may be comprised in the base station 104 or connected to the base station 104.

The rectifier 211 is an electronic component that converts alternating current (AC) from the power grid into direct current (DC). The rectifier 211 may be part of the PSU 210 of the base station 104. The rectifier 211 ensures that the electronic circuits in the base station 104 receive stable and continuous DC power for their operation.

The rectifier 211 may use various technologies to accomplish this AC-to-DC conversion, such as silicon-based diodes, silicon carbide (SiC) diodes, or gallium nitride (GaN) diodes. The converted DC voltage may be regulated and filtered to meet the specific power requirements of the base station's internal components, such as transceivers, signal processors, and controllers.

The efficiency of the rectifier 211 may be defined as output DC power as a function of input AC power. Thus, the efficiency of the rectifier 211 depends on the AC power of the rectifier 211. The AC power depends on the cell load of the base station. When the cell load is less or more than optimum, the rectifier efficiency is not optimal.

The cell load of the base station 104 refers to the amount of resources currently being utilized or occupied in a specific cell managed by that base station. The cell load may depend on at least one of the following metrics: radio resource utilization, number of UE connections, processing load, or backhaul utilization.

Radio resource utilization refers to the use of frequency spectrum and time slots for uplink and downlink data transmission.

The number of UE connections refers to the number of active (connected) and/or idle UEs in the cell, which can affect the base station's capacity to accommodate more users.

The processing load refers to the computational effort required for tasks such as modulation, demodulation, and encoding/decoding of signals.

The backhaul utilization refers to the load on the backhaul links that connect the base station to the core network (e.g., measured in terms of data throughput).

One problem is that, due to the dynamic nature of the cell load and therefore power consumption, the rectifier 211 may not always operate on the optimum range. Thus, the efficiency of the rectifier may not always be optimal.

In an example embodiment for solving the above problem, the PSU 210 may be configured to collect AC and DC measurements (power, voltage, current) for varying operating conditions like ambient temperature and/or other environmental parameters, and to report the measurements to the controller 200.

Furthermore, the base station 104 may be configured to collect measurements for the cell load, and to report the cell load measurements to the controller 200.

The controller 200 may be a software program running in the NMS 230, or a SON function, or the VPP controller, or the ESM 220, or other entity. The controller 200 may be configured to use the above measurements (but not limited to them) to create a mapping between the cell load and the rectifier efficiency in varying operating conditions (e.g., temperature, AC and DC power). For example, the controller 200 may be configured to firstly create a rectifier efficiency mapping for different temperatures by mapping from AC to DC, and secondly create a mapping between the cell load and the rectifier efficiency based on the mapping from AC to DC.

The controller 200 may dynamically find the mapping from power levels, traffic and temperature and/or other environmental parameters to the efficiency of the rectifier 211 at a given moment.

Alternatively, the controller 200 may have a static mapping table from traffic and temperature and/or other environmental parameters to the existing efficiency of the rectifier 211.

The mapping may be used to adjust the cell load, so that the cell load is kept in the optimum area corresponding to the optimum efficiency of the rectifier 211.

Alternatively, or additionally, the mapping may be used to modify PSU parameters, so that the AC power consumption of the base station 104 stays in the optimum range, and power consumption above a given limit is taken from the one or more batteries of the base station 104.

When the cell load is too low compared to the optimum, the load point can be optimized by increasing the power consumption of the base station 104 through recharging one or more batteries of the base station 104.

The optimization can be done based on the day, traffic and temperature estimated based on history with artificial intelligence (AI) or machine learning (ML), for example.

The mapping information may be provided as input to the ESM 220 or similar functionality that makes the above configuration changes to keep the AC power consumption in the PSU 210 at the optimum level.

During load shifting, the change in the efficiency of the rectifier 211 (lower efficiency with low loads) should be considered in the decision making at the load shifting function 240. Thus, the controller 200 may transmit, to the load shifting function 240, information indicating the efficiency of the rectifier 211.

Another problem relates to the fact that the AC power available to the base station 104 may be limited. For example, during high traffic peaks, the power consumption of the base station 104 may exceed the available AC power, leading to the need to power down radios, or reset the base station 104.

In an example embodiment for solving the above problem, the PSU 210 may be configured to collect measurements about battery and rectifier status, and to report the measurements to the controller 200. For example, these measurements may comprise at least one of: state of charge (SOC), state of health (SOH), and/or AC power consumption.

Based on the measurement history information and battery capacity and health information, the controller 200 may adjust or modify the PSU configuration parameters so that the AC power consumption of the base station 104 is minimized, and power consumption above a given limit or threshold is taken from the one or more batteries, while ensuring that the one or more batteries are not drained empty and the battery health condition is not deteriorated (e.g., the number of discharge cycles may be limited, as too many discharge cycles may damage the batteries).

In another example embodiment, the measurement history and battery information may be used by the controller 200 to define a threshold for the allowed cell load so that the AC power consumption of the base station 104 would stay below the threshold. The defined threshold may be provided from the controller 200 as input to the ESM 220 or similar functionality to reduce traffic and to keep the AC power consumption in the PSU 210 at an optimum level. When defining the PSU and cell load configuration parameters, also traffic data history can be taken into account.

Another problem relates to the fact that, in a virtual power plant (VPP) scenario, switching entire cell sites to operate on battery power results in low granularity when adding more reserve capacity (e.g., leading to 5 kW steps). During the execution of specific VPP use cases, such as FCR, the battery charging should be initiated in a gradual manner, using small, discrete steps (e.g., one-second intervals for FCR), when it is not possible for the entire cell site to switch to charging mode.

In an example embodiment for solving the above problem, the controller 200 may be configured to adjust or modify the PSU configuration parameters during VPP execution, so that only a part of the AC power consumption of the base station 104 is used as a reserve. This may be achieved by setting a power threshold or current threshold, so that the AC power consumption of the base station 104 is limited according to the given threshold, and the power consumption above the threshold is served from the one or more batteries. The amount over the threshold may be equal to the activated reserve in this cell site.

Figure 3:
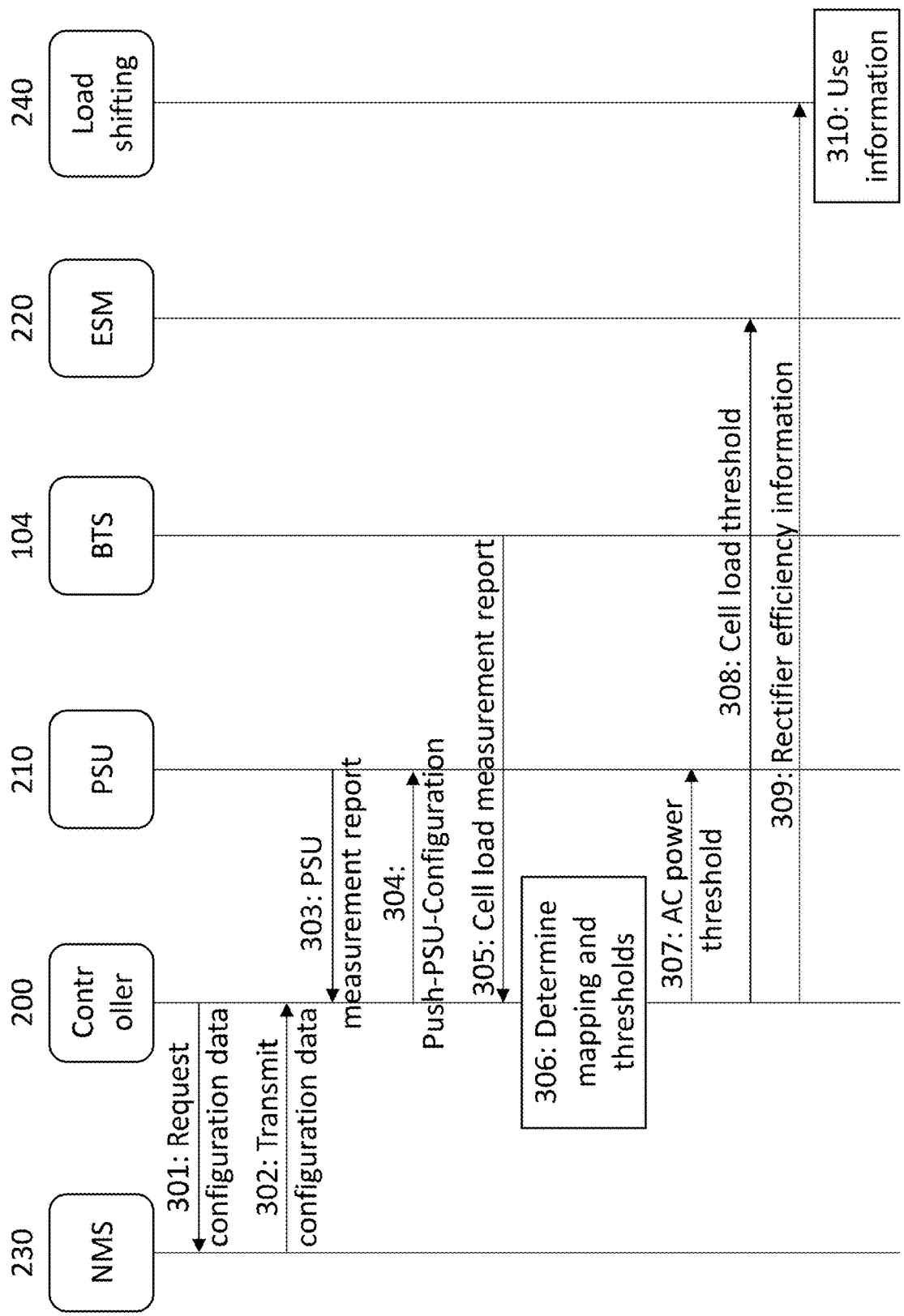
FIG. 3 illustrates a signal flow diagram.

FIG. 3 illustrates a signal flow diagram according to an example embodiment.

Referring to FIG. 3, at 301, the controller 200 transmits, to the NMS 230, a request for configuration data.

At 302, the NMS 230 transmits the configuration data to the controller 200 based on the request. The configuration data may be used for the initial configuration of the controller 200 and the PSU 210.

At 303, the PSU 210 reports, to the controller 200, measurement information for one or more parameters related to the efficiency of the rectifier 211 of the PSU 210. The PSU 210 receives the measurement information. The reporting may be based on request-response.

The measurement information from the PSU 210 may comprise, for example, a set of measurements under varying operating conditions from a certain time window for at least one of the following parameters: AC power, DC power, AC voltage, DC voltage, AC current, or DC current. In other words, the measurement information may comprise historical measurement information.

The PSU 210 may also report, to the controller 200, battery-related information comprising at least one of: a state of charge of one or more batteries of the base station 104, or a state of health of the one or more batteries of the base station 104.

The state of charge is a metric used to express the current energy level of a battery, for example as a percentage of its total capacity.

The state of health of a battery is a metric that provides an estimate of the battery's overall condition relative to its original specifications when it was new. This indicator may be expressed as a percentage and serves as a comprehensive assessment of the battery's capacity, performance, and expected lifespan. It reflects the battery's current ability to store and deliver energy compared to its initial capabilities.

The varying operating conditions may comprise at least one of: varying ambient temperatures, variations in performance characteristics between individual rectifiers, or aging of the individual rectifiers. In other words, the measurement information may also include ambient temperature and/or other environmental parameters from a certain time window.

The ambient temperature refers to the surrounding air temperature in the environment where the rectifier 211 is installed and operating. The ambient temperature may significantly influence the performance, efficiency, and longevity of the rectifier 211.

The variations (differences) in the performance characteristics may be due to manufacturing tolerances, material inconsistencies, or other minor variations in the production process. For example, each individual rectifier may have slightly different efficiency curves, voltage drop characteristics, thermal behavior, or other performance metrics under the same operating conditions. Additionally, the response of these rectifiers to varying operating conditions such as temperature, load changes, or input frequency might also differ.

Aging may significantly affect the performance, reliability, and efficiency of the rectifier 211. Over time, the electronic components within the rectifier 211 may degrade due to a variety of factors, leading to altered characteristics and reduced functionality. For example, the efficiency of the rectifier 211 may decline over time due to component wear, leading to higher energy consumption. Components like diodes and capacitors may lose their effectiveness over time, causing increased losses during the AC-to-DC conversion.

At 304, the controller 200 transmits a configuration (Push-PSU-Configuration) to the PSU 210 for applying the initial configuration at the PSU 210.

At 305, the base station 104 (or another entity having cell load reports available) reports, to the controller 200, cell load measurements indicative of a cell load of the base station 104 over a certain time window. In other words, the cell load measurements may comprise historical measurement information. The controller 200 receives the cell load measurements. The reporting may be based on request-response.

The cell load measurements may be continuously collected by the base station 104 (or other entity). The cell load measurements related to the resource utilization (e.g., number of resource blocks) and data traffic levels within a wireless communication network, at the level of one or more individual cells within the network.

At 306, the controller 200 determines, based on the measurement information and the cell load measurements, a mapping (i.e., correlation) between the cell load and the efficiency of the rectifier.

The mapping may be determined for the rectifier 211 based on at least one of: an ambient temperature at the rectifier 211, or an age of the rectifier 211. In other words, the mapping may be determined per rectifier and per temperature. Because of the aging of the rectifier 211, the mapping may be repeated from time to time.

For example, the controller 200 may create a mapping table from the input parameters (e.g., cell load, AC power, DC power) to the efficiency of the rectifier 211. The efficiency mapping from AC and DC (e.g., see FIG. 4) can be made for different temperatures and/or other environmental parameters. The cell load to DC mapping can be made based on the reported DC power and corresponding cell load. These two mapping tables can be used to create the mapping between the cell load and the efficiency of the rectifier 211 (e.g., see FIG. 5).

The controller 200 may determine a threshold (e.g., a limit for AC power or AC current) for limiting AC power consumption of the base station 104, wherein the threshold may be determined based at least on the set of measurements for the AC power. For example, the threshold may be determined based on the mappings shown in FIG. 4, FIG. 5 and FIG. 6. The threshold may be determined based further on the battery-related information, so that the AC power consumption does not exceed the threshold, while battery duration is optimized. In other words, the battery-related information may be used to determine if there is enough battery capacity available.

Alternatively, or additionally, the controller 200 may determine one or more thresholds for controlling the cell load of the base station 104, wherein the one or more thresholds may be determined based at least on the set of measurements for the AC power. For example, the one or more thresholds may be determined based on the mappings shown in FIG. 4, FIG. 5 and FIG. 6. The one or more thresholds may be determined based further on the battery-related information. In other words, the battery-related information may be used to determine if there is enough battery capacity available.

At 307, the controller 200 may transmit or indicate the threshold to the PSU 210 to set the threshold for limiting the AC power consumption of the base station 104, such that power consumption of the base station 104 above the threshold is supplied from the one or more batteries of the base station 104. For example, the threshold may comprise a threshold value for AC power or DC current. The PSU 210 may internally convert the threshold value to the parameter(s) needed to limit the AC power consumption and to use the one or more batteries (e.g., convert AC power to DC current). In this way, the controller 200 may adjust one or more configuration parameters of the power supply unit 210 based on the mapping.

Alternatively, or additionally, the controller 200 may transmit, to the power supply unit 210, a command for recharging one or more batteries of the base station 104 to move an operation point of the rectifier 211 towards an optimum point based on the mapping. For example, when the cell load is too low compared to the optimum, the load point can be optimized by increasing the power consumption through recharging the one or more batteries.

At 308, the controller 200 may transmit or indicate the one or more thresholds to the ESM 220 to set the one or more thresholds for controlling the cell load of the base station 104. The ESM 220 may control the cell load within a range defined by the one or more thresholds, such that the efficiency of the rectifier is in an optimum range or level based on the mapping. For example, based on the one or more thresholds, the ESM 220 may reduce the cell load to reduce the AC power consumption of the base station 104, and thus reach the optimum level 506 shown in FIG. 5. In this way, the controller 200 may adjust the cell load of the base station 104 based on the mapping.

At 309, the controller 200 may transmit, to the load shifting function 240, information indicating the efficiency of the rectifier based on the mapping.

At 310, the load shifting function 240 may use the information indicating the efficiency of the rectifier for at least one of: determining a time and an amount of load shifting associated with the base station 104, determining an impact of the efficiency of the rectifier 211 to potential cost savings due to the load shifting associated with the base station 104, or optimizing one or more battery charging parameters of the base station 104 for the load shifting (e.g., not charging the one or more batteries full, but find and use an optimal charge level).

For example, the load shifting function 240 may operate the base station 104 (cell site) with battery power, when the electricity price is high (e.g., above a threshold), and recharge the one or more batteries when the electricity price is low (e.g., below a threshold). However, it should be noted that operating on battery power may result in lower efficiency due to the presence of a baseline AC load. Consequently, the actual AC energy consumption during battery operation may not decrease as much as one would anticipate. Additionally, the AC energy consumed during the recharging of the one or more batteries might exceed the AC energy needed to offset the battery operation. This net energy imbalance should be considered when evaluating the decision to implement load shifting. In the same way, if AC power consumption increases during recharging, the rectifier 211 may be in the low efficiency range.

Figure 4:
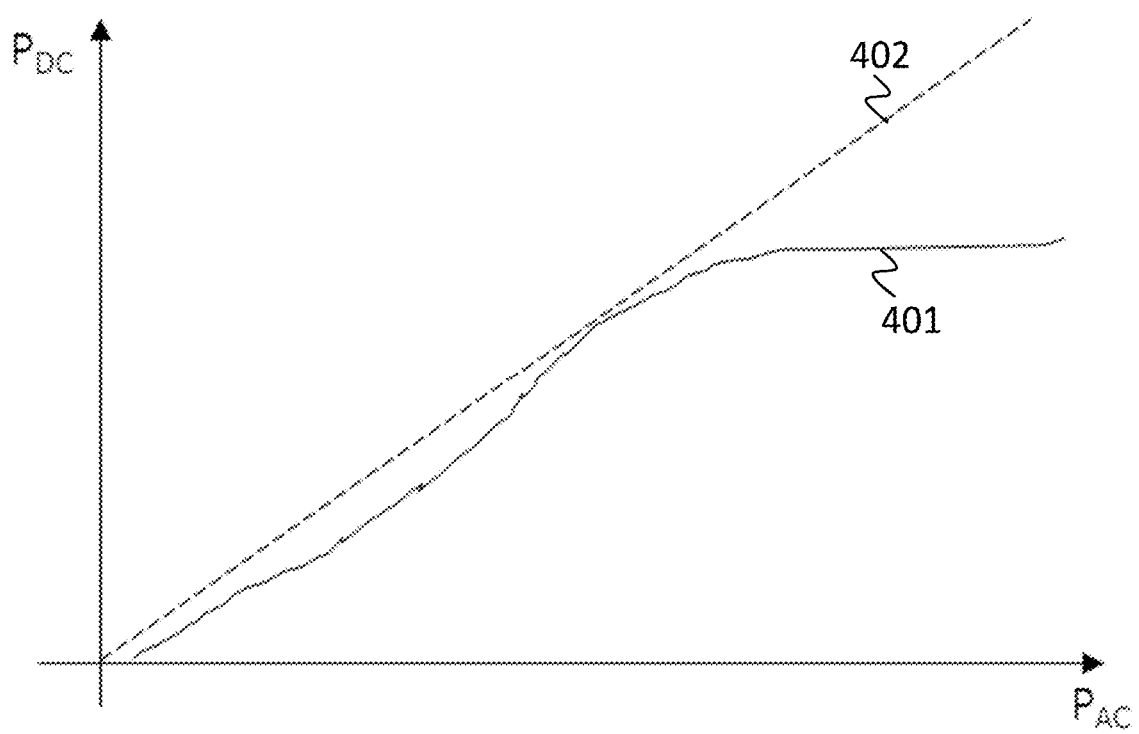
FIG. 4 illustrates an example of DC power as a function of AC power.

FIG. 4 illustrates an example 401 of DC power (denoted as $P_{DC}$) as a function of AC power (denoted as $P_{AC}$). The dotted line 402 depicts the linear (optimum) behavior.

Figure 5:
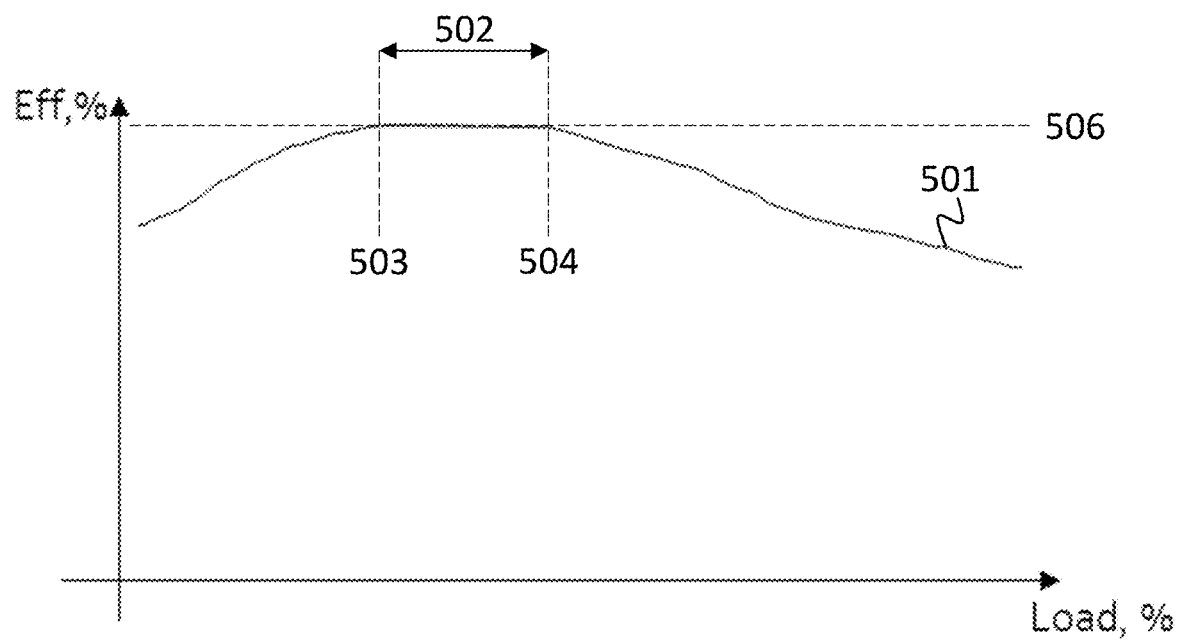
FIG. 5 illustrates an example of the efficiency of a rectifier as a function of cell load.

FIG. 5 illustrates an example 501 of the efficiency of the rectifier 211 as a function of the cell load. In other words, FIG. 5 illustrates an example of the mapping 501 between the cell load and the efficiency of the rectifier 211. The controller 200 may set one or more thresholds 503, 504 at the ESM 220 for controlling the cell load within the range 502 defined by the one or more thresholds 503, 504 (e.g., above threshold 503 and/or below threshold 504). The ESM 220 may keep the cell load in the range 502 defined by the one or more thresholds 503, 504, so that the rectifier 211 operates in the optimum range or level 506.

Figure 6:
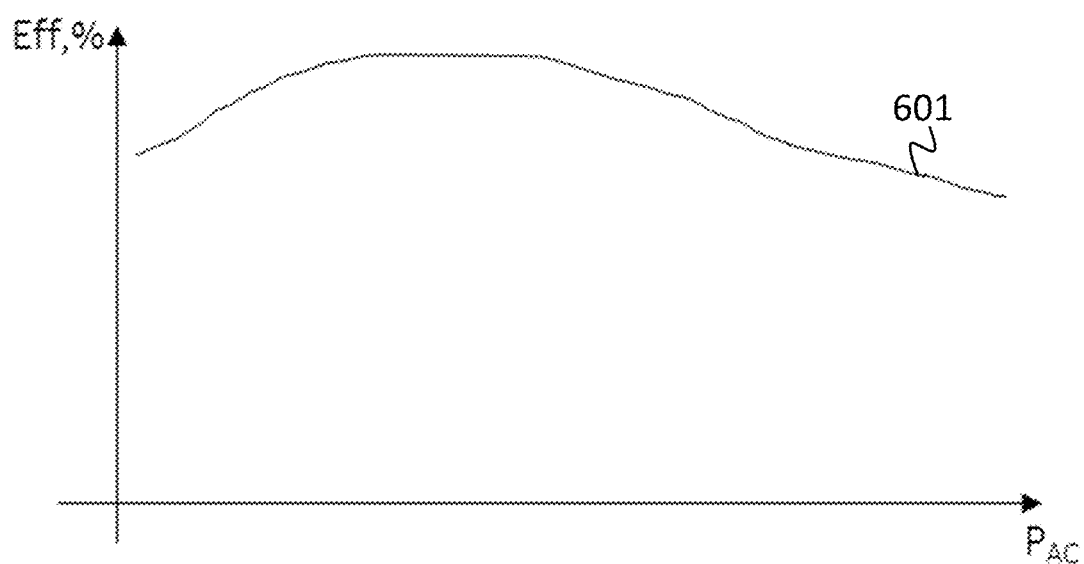
FIG. 6 illustrates an example of the efficiency of a rectifier as a function of AC power.

FIG. 6 illustrates an example 601 of the efficiency of the rectifier 211 as a function of AC power (denoted as $P_{AC}$). Instead of AC power, the efficiency of the rectifier 211 could also be illustrated as a function of DC power.

Figure 7:
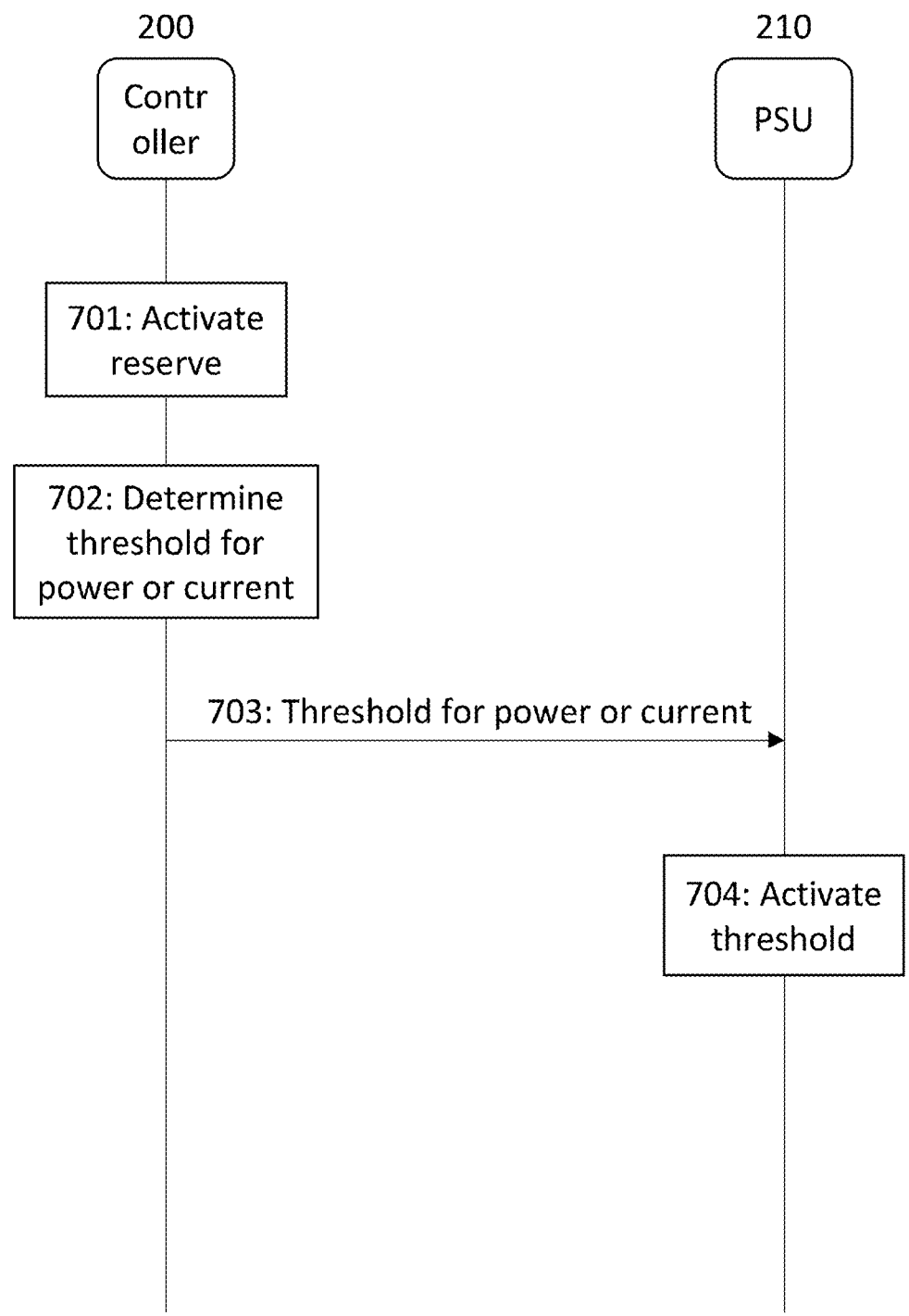
FIG. 7 illustrates a signal flow diagram.

FIG. 7 illustrates a signal flow diagram according to an example embodiment for partial VPP activation, wherein the base station 104 is partially activated as a reserve for VPP. The term "reserve" refers to the standby or backup electrical capacity that can be provided on demand to meet the requirements of the power grid. For example, the one or more batteries of the base station 104 may be used as a reserve, such that the base station 104 may be at least partially operated on battery power, when the energy demand in the power grid is too high compared to the energy supply.

Referring to FIG. 7, at 701, the controller 200 receives a command or trigger from a VPP controller to activate the reserve. The controller 200 decides participating base stations (cell sites) and their contribution to the reserve (contribution≤site power or capacity).

At 702, the controller 200 determines a threshold for limiting AC power consumption of the base station 104, wherein the threshold is determined based at least on the one or more commands received from the VPP controller. For example, the controller 200 may determine a threshold for AC power or AC current (current power-reserve contribution), so that the desired reserve can be activated.

The threshold may be determined or adjusted continuously (almost in real time, e.g., every second) based on the commands received from the VPP controller.

At 703, the controller 200 transmits or indicates the threshold to the PSU 210 of the base station 104 to set the threshold for limiting the AC power consumption of the base station 104, such that power consumption of the base station 104 above the threshold is supplied from one or more batteries of the base station.

At 704, the PSU 210 activates the threshold, so that part of the power consumption of the base station 104 (up to the threshold) is taken from AC (i.e., from the power grid) and the rest of the power consumption is taken from the one or more batteries of the base station 104.

Figure 8:
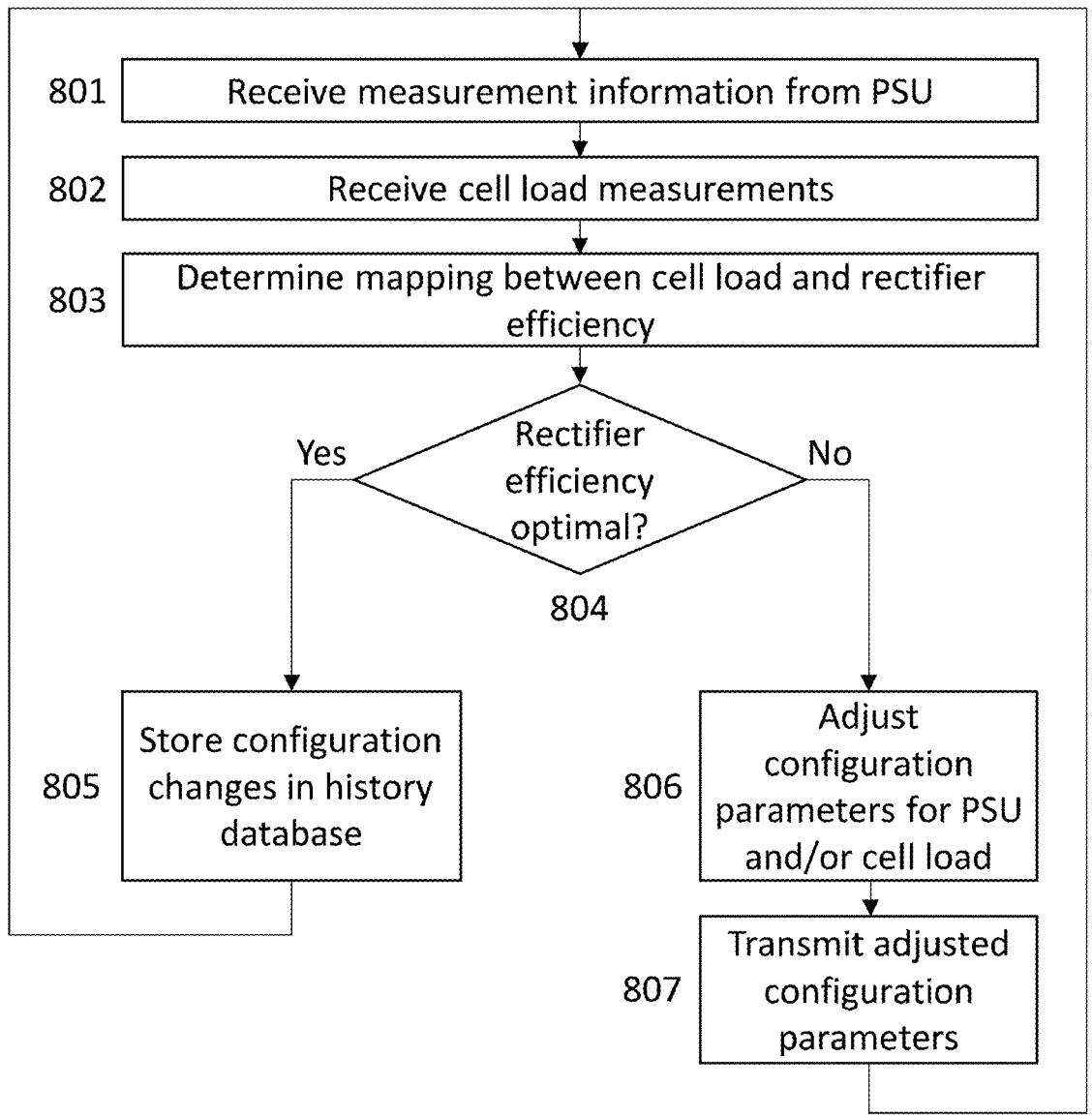
FIG. 8 illustrates a flow chart.
Figure 10:
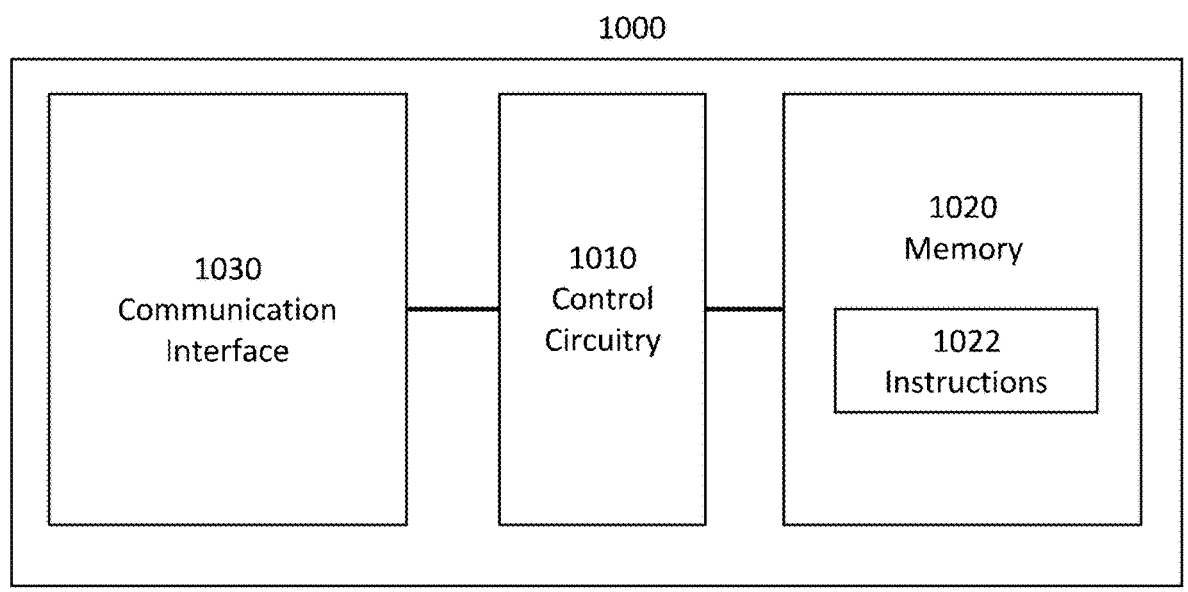
FIG. 10 illustrates an example of an apparatus.

FIG. 8 illustrates a flow chart according to an example embodiment of a method performed by an apparatus 1000 depicted in FIG. 10. The apparatus 1000 may comprise the controller 200. For example, the apparatus 1000 may be, or comprise, or be comprised in, a base station 104 of a radio access network, or a near-real-time radio access network intelligent controller, or a network management system 230.

Referring to FIG. 8, in block 801, the apparatus 1000 receives, from a power supply unit 210 of a base station 104, measurement information for one or more parameters related to an efficiency of a rectifier 211 of the power supply unit 210.

For example, the measurement information received from the power supply unit 210 may comprise a set of measurements under varying operating conditions for at least one of the following parameters: alternating current (AC) power, direct current (DC) power, AC voltage, DC voltage, AC current, or DC current.

In block 802, the apparatus 1000 receives cell load measurements indicative of a cell load of the base station 104.

In block 803, the apparatus 1000 determines, based on the measurement information and the cell load measurements, a mapping 501 between the cell load and the efficiency of the rectifier 211.

For example, the apparatus 1000 may determine a mapping 401 of AC power to DC power to create a rectifier efficiency table as a function of AC power (e.g., per temperature range). The apparatus 1000 may then determine a mapping of the cell load to AC power or DC power, and apply it to the rectifier efficiency table to create the mapping 501 between the cell load and the efficiency of the rectifier 211.

In block 804, the apparatus 1000 determines, based on the mapping 501, whether the efficiency of the rectifier 211 is in an optimum range or level 506. For example, the apparatus 1000 may determine whether the cell load is in the optimum range 502 and/or below peak load.

In block 805, if the efficiency of the rectifier is in the optimum range or level 506 (block 804: yes), the apparatus 1000 stores the previous configuration changes (from block 806 of a previous iteration) in a history database for an artificial intelligence or machine learning algorithm.

Alternatively, in block 806, if the efficiency of the rectifier is not in the optimum range or level 506 (block 804: no), then the apparatus adjusts, based on the mapping, at least one of: the cell load of the base station 104, and/or one or more configuration parameters of the power supply unit 210. For example, the adjustment may be performed by using the artificial intelligence or machine learning algorithm.

The cell load may be adjusted to reach the optimum range or level 506 of the efficiency of the rectifier 211 according to the mapping 501, based on determining that the efficiency of the rectifier 211 is not in the optimum range or level 506. For example, the adjustment of the cell load may comprises adjusting at least one of the following parameters: a number of active users or connections, a number of idle users or connections, a (data) throughput for one or more quality of service (QOS) classes, a total (data) throughput, or one or more quality of service settings for one or more quality of service classes. As an example, the adjustment of the cell load may comprise adjusting block error rate (BLER) and/or bit error rate (BER).

The one or more configuration parameters of the power supply unit 210 may be adjusted to reach the optimum range or level 506 of the efficiency of the rectifier 211, based on determining that the efficiency of the rectifier 211 is not in the optimum range or level 506. The one or more configuration parameters of the power supply unit 210 may comprise at least one of: AC power, DC power, AC voltage, DC voltage, AC current, or DC current.

In block 807, the apparatus 1000 transmits the adjusted configuration parameters (configuration changes) to the relevant entities. For example, the apparatus 1000 may transmit the one or more adjusted cell load parameters to the ESM 220. Alternatively, or additionally, the apparatus 1000 may transmit the one or more adjusted configuration parameters of the power supply unit 210 to the power supply unit 210.

Following block 805 or 807, the process may return to block 801. In other words, the method of FIG. 8 may be performed iteratively or continuously.

Figure 9:
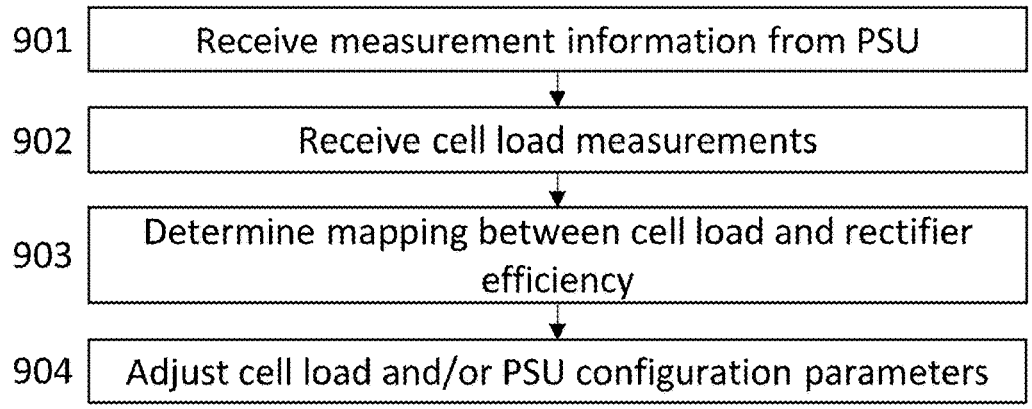
FIG. 9 illustrates a flow chart.

FIG. 9 illustrates a flow chart according to an example embodiment of a method performed by an apparatus 1000 depicted in FIG. 10. The apparatus 1000 may comprise the controller 200. For example, the apparatus 1000 may be, or comprise, or be comprised in, a base station 104 of a radio access network, or a near-real-time radio access network intelligent controller, or a network management system 230.

Referring to FIG. 9, in block 901, the apparatus 1000 receives, from a power supply unit 210 of a base station 104, measurement information for one or more parameters related to an efficiency of a rectifier 211 of the power supply unit 210.

In block 902, the apparatus 1000 receives cell load measurements indicative of a cell load of the base station 104.

In block 903, the apparatus 1000 determines, based on the measurement information and the cell load measurements, a mapping between the cell load and the efficiency of the rectifier 211.

In block 904, the apparatus 1000 adjusts, based on the mapping, at least one of: the cell load of the base station 104, or one or more configuration parameters of the power supply unit 210.

For example, the measurement information received from the power supply unit 210 may comprise a set of measurements under varying operating conditions for at least one of the following parameters: alternating current (AC) power, direct current (DC) power, AC voltage, DC voltage, AC current, or DC current.

The apparatus 1000 may determine a threshold for limiting AC power consumption of the base station 104, wherein the threshold may be determined based at least on the set of measurements for the AC power and/or based on the mapping. In this case, the adjustment of the one or more configuration parameters of the power supply unit 210 may comprise at least setting the threshold for limiting the AC power consumption of the base station 104, such that power consumption of the base station 104 above the threshold is supplied from one or more batteries of the base station 104.

The apparatus 1000 may receive, from the power supply unit 210 of the base station 104, battery-related information comprising at least one of: a state of charge of one or more batteries of the base station, or a state of health of the one or more batteries of the base station, wherein the threshold may be determined based further on the battery-related information.

The apparatus 1000 may determine one or more thresholds 503, 504 for controlling the cell load of the base station 104, wherein the one or more thresholds 503, 504 may be determined based at least on the set of measurements for the AC power and/or based on the mapping. In this case, the adjustment of the cell load may comprises at least setting the one or more thresholds 503, 504 for controlling the cell load of the base station 104. The one or more thresholds 503, 504 may be determined based further on the battery-related information.

The adjustment of the cell load may (further) comprise controlling the cell load within a range defined by the one or more thresholds 503, 504, such that the efficiency of the rectifier is in an optimum range or level 506 based on the mapping.

The varying operating conditions may comprise at least one of: varying ambient temperatures, variations in performance characteristics between individual rectifiers, or aging of the individual rectifiers. The mapping may be determined for the rectifier 211 based on at least one of: an ambient temperature at the rectifier 211, or an age of the rectifier 211.

The apparatus 1000 may determine, based on the mapping, whether the efficiency of the rectifier 211 is in an optimum range or level 506, wherein the cell load may be adjusted to reach the optimum range or level 506 of the efficiency of the rectifier 211 according to the mapping, based on determining that the efficiency of the rectifier 211 is not in the optimum range or level 506.

The adjustment of the cell load may comprise adjusting at least one of the following parameters: a number of active users or connections, a number of idle users or connections, a throughput for one or more quality of service classes, a total throughput, or one or more quality of service settings for one or more quality of service classes.

The apparatus 1000 may determine, based on the mapping, whether the efficiency of the rectifier 211 is in an optimum range or level 506, wherein the one or more configuration parameters of the power supply unit 211 may be adjusted to reach the optimum range or level 506 of the efficiency of the rectifier 211, based on determining that the efficiency of the rectifier 211 is not in the optimum range or level.

The one or more configuration parameters of the power supply unit 210 may comprise at least one of: AC power, DC power, AC voltage, DC voltage, AC current, or DC current.

The apparatus 1000 may determine a threshold for limiting AC power consumption of the base station 104, wherein the threshold may be determined based at least on one or more commands received from a virtual power plant controller. In this case, the adjustment of the one or more configuration parameters of the power supply unit 210 may comprise at least setting the threshold for limiting the AC power consumption of the base station 104, such that power consumption of the base station 104 above the threshold is supplied from one or more batteries of the base station 104.

The apparatus 1000 may transmit, to a load shifting function 240, information indicating the efficiency of the rectifier 211. Transmitting the information to the load shifting function 240 may cause the load shifting function 240 to use the information for at least one of: determining a time and an amount of load shifting associated with the base station 104, determining an impact of the efficiency of the rectifier 211 to potential cost savings due to the load shifting associated with the base station 104, or optimizing one or more battery charging parameters of the base station 104 for the load shifting. The load shifting function 240 may be comprised in the apparatus 1000 or in another apparatus.

The apparatus 1000 may transmit, to the power supply unit 210, a command for recharging one or more batteries of the base station 104 to move an operation point of the rectifier 211 towards an optimum point based on the mapping.

The blocks, related functions, and information exchanges (messages) described above by means of FIGS. 3, 7, 8 and 9 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

FIG. 10 illustrates an example of an apparatus 1000 comprising means for performing one or more of the example embodiments described above. For example, the apparatus 1000 may be, or comprise, or be comprised in, a base station 104 of a radio access network, or a near-real-time radio access network intelligent controller, or a network management system 230.

The apparatus 1000 may comprise, for example, a circuitry or a chipset applicable for realizing one or more of the example embodiments described above. The apparatus 1000 may be an electronic device or computing system comprising one or more electronic circuitries. The apparatus 1000 may comprise a control circuitry 1010 such as at least one processor, and at least one memory 1020 storing instructions 1022 which, when executed by the at least one processor, cause the apparatus 1000 to carry out one or more of the example embodiments described above. Such instructions 1022 may, for example, include computer program code (software). The at least one processor and the at least one memory storing the instructions may provide the means for providing or causing the performance of any of the methods and/or blocks described above.

The processor is coupled to the memory 1020. The processor is configured to read and write data to and from the memory 1020. The memory 1020 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1020 stores computer readable instructions that are executed by the processor. For example, non-volatile memory stores the computer readable instructions, and the processor executes the instructions using volatile memory for temporary storage of data and/or instructions.

The computer readable instructions may have been prestored to the memory 1020 or, alternatively or additionally, they may be received, by the apparatus, via an electromagnetic carrier signal and/or may be copied from a physical entity such as a computer program product. Execution of the computer readable instructions causes the apparatus 1000 to perform one or more of the functionalities described above.

The memory 1020 may be implemented using any suitable data storage technology, such as semiconductor-based memory devices, flash memory, magnetic memory devices and systems, optical memory devices and systems, fixed memory and/or removable memory.

The apparatus 1000 may further comprise or be connected to a communication interface 1030 comprising hardware and/or software for realizing communication connectivity according to one or more communication protocols. The communication interface 1030 may comprise at least one transmitter (Tx) and at least one receiver (Rx) that may be integrated to the apparatus 1000 or that the apparatus 1000 may be connected to. The communication interface 1030 may provide means for performing some of the blocks for one or more example embodiments described above. The communication interface 1030 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 1030 provides the apparatus with communication capabilities to communicate in the wireless communication network. The communication interface 1030 may, for example, provide a radio, cable or fiber interface for communicating with the network entities shown in FIG. 2.

It is to be noted that the apparatus 1000 may further comprise various components not illustrated in FIG. 10. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways within the scope of the claims. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising at least one processor, and at least one memory storing instructions that, when executed by the at least one processor, cause the apparatus at least to:
   receive, from a power supply unit of a base station, measurement information for one or more parameters related to an efficiency of a rectifier of the power supply unit;
   receive cell load measurements indicative of a cell load of the base station, wherein the cell load represents an amount of radio resources utilized in a cell managed by the base station;
   determine, based on the measurement information and the cell load measurements, a mapping between the cell load and the efficiency of the rectifier;
   adjust, based on the mapping, the cell load of the base station; and
   determine, based on the mapping, whether the efficiency of the rectifier is in an optimum range or level,
   wherein the cell load is adjusted to reach the optimum range or level of the efficiency of the rectifier according to the mapping, based on determining that the efficiency of the rectifier is not in the optimum range or level.

2. The apparatus according to claim 1, wherein the measurement information received from the power supply unit comprises a set of measurements under varying operating conditions for at least one of the following parameters:
   alternating current, AC power,
   direct current, DC power,
   AC voltage,
   DC voltage,
   AC current, or
   DC current.

3. The apparatus according to claim 2, further being caused to:
   determine a threshold for limiting AC power consumption of the base station, wherein the threshold is determined based at least on the set of measurements for the AC power; and
   adjust one or more configuration parameters of the power supply unit,
   wherein the adjustment of the one or more configuration parameters of the power supply unit comprises at least setting the threshold for limiting the AC power consumption of the base station, such that power consumption of the base station above the threshold is supplied from one or more batteries of the base station.

4. The apparatus according to claim 2, wherein the varying operating conditions comprise at least one of: varying ambient temperatures, variations in performance characteristics between individual rectifiers, or aging of the individual rectifiers,
   wherein the mapping is determined for the rectifier based on at least one of: an ambient temperature at the rectifier, or an age of the rectifier.

5. The apparatus according to claim 3, further being caused to:
   receive, from the power supply unit of the base station, battery-related information comprising at least one of:
   a state of charge of the one or more batteries of the base station, or
   a state of health of the one or more batteries of the base station,
   wherein the threshold is determined based further on the battery-related information.

6. The apparatus according to claim 3, wherein the one or more configuration parameters of the power supply unit comprise at least one of:
   AC power,
   DC power,
   AC voltage,
   DC voltage,
   AC current, or
   DC current.

7. The apparatus according to claim 1, further being caused to:
   determine one or more thresholds for controlling the cell load of the base station, wherein the one or more thresholds are determined based at least on the set of measurements for the AC power,
   wherein the adjustment of the cell load comprises at least setting the one or more thresholds for controlling the cell load of the base station.

8. The apparatus according to claim 7, wherein the adjustment of the cell load comprises controlling the cell load within a range defined by the one or more thresholds, such that the efficiency of the rectifier is in an optimum range or level based on the mapping.

9. The apparatus according to claim 1, wherein the adjustment of the cell load comprises adjusting at least one of the following parameters:
   a number of active users or connections,
   a number of idle users or connections,
   a throughput for one or more quality of service classes,
   a total throughput, or
   one or more quality of service settings for one or more quality of service classes.

10. The apparatus according to claim 1, further being caused to:
    determine, based on the mapping, whether the efficiency of the rectifier is in an optimum range or level; and
    adjust one or more configuration parameters of the power supply unit,
    wherein the one or more configuration parameters of the power supply unit are adjusted to reach the optimum range or level of the efficiency of the rectifier, based on determining that the efficiency of the rectifier is not in the optimum range or level.

11. The apparatus according to claim 1, further being caused to:
    determine a threshold for limiting AC power consumption of the base station, wherein the threshold is determined based at least on one or more commands received from a virtual power plant controller; and
    adjust one or more configuration parameters of the power supply unit,
    wherein the adjustment of the one or more configuration parameters of the power supply unit comprises at least setting the threshold for limiting the AC power consumption of the base station, such that power consumption of the base station above the threshold is supplied from one or more batteries of the base station.

12. The apparatus according to claim 1, further being caused to:
    transmit, to a load shifting function, information indicating the efficiency of the rectifier.

13. The apparatus according to claim 12, wherein transmitting the information to the load shifting function causes the load shifting function to use the information for at least one of:
    determining a time and an amount of load shifting associated with the base station,
    determining an impact of the efficiency of the rectifier to potential cost savings due to the load shifting associated with the base station, or
    optimizing one or more battery charging parameters of the base station for the load shifting.

14. The apparatus according to claim 1, further being caused to:
    transmit, to the power supply unit, a command for recharging one or more batteries of the base station to move an operation point of the rectifier towards an optimum point based on the mapping.

15. A method comprising:
    receiving, from a power supply unit of a base station, measurement information for one or more parameters related to an efficiency of a rectifier of the power supply unit;
    receiving cell load measurements indicative of a cell load of the base station, wherein the cell load represents an amount of radio resources utilized in a cell managed by the base station;
    determining, based on the measurement information and the cell load measurements, a mapping between the cell load and the efficiency of the rectifier;
    adjusting, based on the mapping, the cell load of the base station; and
    determining, based on the mapping, whether the efficiency of the rectifier is in an optimum range or level,
    wherein the cell load is adjusted to reach the optimum range or level of the efficiency of the rectifier according to the mapping, based on determining that the efficiency of the rectifier is not in the optimum range or level.

16. A non-transitory computer readable medium comprising program instructions which, when executed by an apparatus, cause the apparatus to perform at least the following:
    receiving, from a power supply unit of a base station, measurement information for one or more parameters related to an efficiency of a rectifier of the power supply unit;
    receiving cell load measurements indicative of a cell load of the base station, wherein the cell load represents an amount of radio resources utilized in a cell managed by the base station;
    determining, based on the measurement information and the cell load measurements, a mapping between the cell load and the efficiency of the rectifier;
    adjusting, based on the mapping, the cell load of the base station; and determining, based on the mapping, whether the efficiency of the rectifier is in an optimum range or level,
wherein the cell load is adjusted to reach the optimum range or level of the efficiency of the rectifier according to the mapping, based on determining that the efficiency of the rectifier is not in the optimum range or level.

\* \* \* \* \*